Dec. 6, 1960   W. H. BUCHSBAUM   2,963,627
ELECTRONIC GUARD
Filed Dec. 3, 1957   4 Sheets-Sheet 1

INVENTOR.
WALTER H. BUCHSBAUM

BY *Donald J. Dietrich*,
AGENT.

Fig. 4

INVENTOR.
WALTER H. BUCHSBAUM

AGENT.

INVENTOR.
WALTER H. BUCHSBAUM

AGENT.

Dec. 6, 1960     W. H. BUCHSBAUM     2,963,627
ELECTRONIC GUARD Filed Dec. 3, 1957                           4 Sheets-Sheet 4

INVENTOR.
WALTER H. BUCHSBAUM
BY
Donald J. Detrich,
AGENT.

United States Patent Office 2,963,627
Patented Dec. 6, 1960

2,963,627

ELECTRONIC GUARD

Walter H. Buchsbaum, Bellerose Manor, N.Y., assignor to American Brake Shoe Company, New York, N.Y., a corporation of Delaware Filed Dec. 3, 1957, Ser. No. 700,403

6 Claims. (Cl. 317—149)

This invention relates to electronic protection or guard devices; more particularly, the invention relates to electronic guard devices which may be conveniently and effectively employed in guarding the working or danger area, for example, of a machine tool such as a press or the like. The present application is a continuation-in-part of application Serial No. 509,259, filed May 18, 1955, which is now abandoned.

In many industrial applications, and particularly with machine tools such as presses and the like, the machine operator is subject to definite physical hazards in the normal operation of the machine. Consequently, numerous safety devices have been proposed and have been utilized for the protection of machine operators. In general, it may be stated that the guard or protection devices which have been utilized most frequently are mechanical in nature, usually including some form of sweeping device which is intended to push the operator's hand, arm, or other member away from the danger area or else comprising a sensing element which halts operation of the machine tool in the event that it makes contact with some portion of the operator's person or with some other foreign object. Electrical and electronic devices have not been as favorably received, as a general rule, because many machine manufacturers and users have considered that devices of this nature are not sufficiently reliable in operation and are not adequately "fail safe."

The criteria which should be met by an industrial protection device may be considered to be as follows: The device should be relatively rapid in action in order to afford maximum protection to a machine operator. Thus, in the case of a punch press, if the operator extends his hand into the working area toward the end of an operating cycle, the protection device should be capable of halting machine operation instantaneously in order to avoid injury to the operator. By the same token, the protection device should be positive in its action and should be actuated even when only a portion of the operator's hand is endangered. Preferably, the guard device should be substantially inertialess; that is, it should be actuated without requiring any exertion of force on the part of the machine operator. In this connection, it should be noted that the guard, for optimum protection, should not be based upon deflection or movement of any physical member but rather should be actuated by a sensing apparatus controlled simply by the presence of a foreign object such as the arm or hand of the operator. In some instances it may be necessary for the guard device to distinguish between a foreign object, such as the operator's hand, and a part of the machine, such as the ram of a punch press. In other applications, it may be desirable to incorporate in the guard device a means for detecting the presence or absence of a workpiece in the machine to afford a means for protecting parts of the machine, such as punches or dies. Moreover, the guard device should disable the machine or other apparatus with which it is associated in the event of failure of its own components or of its power supply.

A primary object of the invention, therefore, is a new and improved electronic guard or protection device which satisfies at least a major portion of the above noted criteria.

Another object of the invention is a new and improved electronic guard device which is inherently fail safe, that is, which causes the machine or other apparatus with which the guard is associated to be rendered safe in the event of failure of its power supply or of any part of the guard.

Another object of the invention is a new and improved electronic guard device which is inherently rapid and positive in its action and which is not dependent upon movement of or pressure against any physical member.

A specific object of the invention is a new and improved electronic guard capable of detecting the presence of a workpiece or a part of the machine and distinguishing from foreign objects such as an operator's hand, arm, or the like.

An additional object of the invention is a new and improved electronic guard device which is relatively simple and economical in construction and operation.

Further objects and advantages of the present invention will be apparent from the following description, reference being had to the accompanying drawings wherein preferred embodiments of the invention are clearly shown.

This invention employs the modification or reduction in effective strength of a radio frequency field at a wave-signal receiver, which modification or reduction may be caused, for example, by an object entering the field, to actuate a control device which indicates or responds to variations in the output signal from the receiver.

Figure 1:
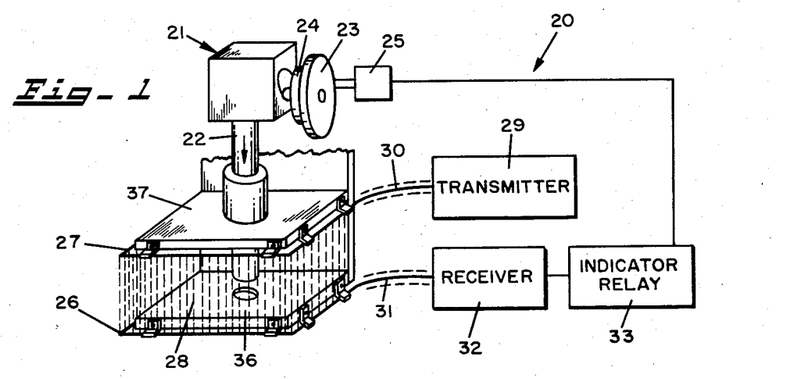
Fig. 1 is a block diagram showing one embodiment of the invention in association with a mechanical press.

Fig. 1 of the drawings illustrates an electronic guard device which constitutes one embodiment of the invention. The apparatus shown therein comprises an electronic guard device 20 for a mechanical press or other machine 21. The machine 21 may be considered to represent a typical mechanical press having a ram 22 which is operated in well known manner as by a fly wheel 23 and a clutch mechanism 24. In the illustrated device, the clutch mechanism 24 is subject to the control of a solenoid operated clutch disengaging mechanism 25.

The electronic guard device 20 includes a transmitting antenna 27 which, in the illustrated apparatus, extends around the periphery of the upper deck or ram guide 37 of the press 21. The guard device further includes a signal generator or transmitter 29 which is electrically coupled to the transmitting antenna 27 by suitable means as the shield cable 30. The transmitter 29 includes any suitable device adapted to generate a radio frequency signal of substantially constant amplitude having a fixed or given constant frequency; this signal is applied to the transmitting antenna 27 to develop a radio frequency field in the usual manner.

The electronic guard 20 further includes a receiving antenna 26 which is disposed within the RF field of the transmitting antenna 27 and which is spaced from the transmitting antenna. The receiving antenna 27, in this instance, is mounted on and extends around the open side of the danger or working area of the press 21, being mounted upon the bed or platen 36 of the press. Thus, the two antennas 26 and 27 effectively outline a curtain-like protection area which encompasses that part of the press which must be avoided by the machine operator in order to avoid injury. Antennas 26 and 27 are preferably covered with insulation in order to prevent accidental grounding or other damage thereto.

A wave signal receiver 32 is incorporated in the electronic guard 20 and is suitably coupled to the receiving antenna 27 as by the shielded cable 31. The receiver 32 may comprise any suitable receiver circuit which may be tuned to the operating frequency of the transmitter 29, and may comprise one or more stages of amplification as well as a suitable detector circuit if desired.

The output stage of the receiver 32 is coupled to a control device comprising the indicator relay 33. The control device 33 may comprise an electronic or electromechanical relay or other similar device which is actuatable between a normal operating condition and a second operating condition in response to an applied signal. The relay 33, in turn, is electrically connected to the solenoid operated clutch disengaging mechanism 25.

In normal operation, the electronic guard 20 is energized by connection to a suitable power supply, not shown, and the signal generator 29 develops a constant frequency constant amplitude RF signal which is supplied to the transmitting antenna 27. The radio frequency field of the antenna 27, as it impinges upon the receiving antenna 26, develops a radio frequency signal in the receiving antenna which is applied to the receiver 32 to develop therein a control signal having an amplitude representative of the strength of the RF field. This control signal is applied to the relay or other control device 33 and normally maintains the relay in first operating condition such that the clutch control mechanism 25 is conditioned to permit engagement of the clutch.

In the event that an electrically conductive object is introduced into the curtain-like protection area defined by the two antennas 26 and 27, however, the strength of the radio frequency field intercepted by the antenna 26 is reduced. As a consequence, the RF signal developed at the antenna is also reduced, with the result that the control signal developed by the receiver 32 changes in amplitude. This change in amplitude of the control signal actuates the control device 33 and thereby effectively conditions the solenoid mechanism 25 to prevent operation of the press 21. The relay or other control device 33 may operate to close an electrical circuit to the solenoid mechanism 25 or to open a control circuit, depending upon the construction and arrangement of the relay and the solenoid mechanism in relation to the clutch 24; preferably, the apparatus is constructed to effectively disengage the clutch 24 in the event that any portion of the transmitter, receiver, and control circuits of the electronic guard 20 fails in its operation or in the event of a failure in the power supply.

Figure 2:
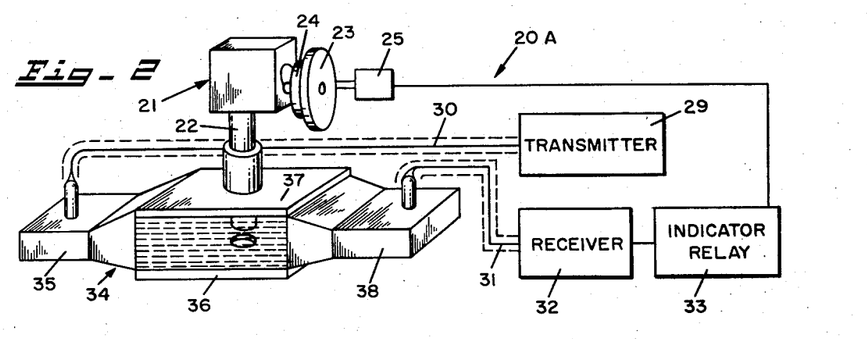
Fig. 2 is a block diagram illustrating a somewhat modified embodiment of the invention.

In Fig. 2 there is shown an electronic guard device 20A, associated with a press or other machine 21, which is in most respects generally similar to the first-described embodiment of the invention. Thus, the electronic guard 20A again comprises a constant-frequency constant-amplitude RF generator 29 utilized as a transmitter, a tuned receiver 32, and an indicator relay 33, the relay 33 being electrically connected to a solenoid operated clutch-control mechanism 25 which is utilized to engage or disengage a clutch 24 in the mechanical drive of the press 21.

The electronic guard 20A differs from that of Fig. 1 only in that the protected working or danger area of the press 21 is effectively contained within a wave-guide assembly 34. The wave-guide assembly 34 includes a first wave-guide box 35 which encompasses the antenna of the transmitter 29 and is electrically connected thereto by means of a shielded cable 30. The wave-guide box 35 is constructed to direct or guide the RF field of the signal generator to develop two curtain-like fields across the opposed open sides of the danger or working area of the press between the bed or platen 36 and the upper deck or ram guide 37. The wave-guide assembly 34 further includes a second or receiving wave-guide box 38 which encloses the antenna of the receiver 32 and is coupled thereto by the shielded cable 31. Thus, in the embodiment of Fig. 2, the entire working area is enclosed by the two sections 35 and 38 of the wave-guide and by the two curtain-like protection area fields which extend across the other sides of the working area.

Operation of this embodiment of the invention is essentially as described thereinabove in connection wtih the electronic guard 20 of Fig. 1. Any relatively conductive article or object which is introduced into the radio frequency fields effectively diminishes the signal developed on the receiving antenna comprising the wave-guide section 38. This reduction in signal amplitude induces a corresponding change in the amplitude of the control signal developed in the receiver 32 and actuates the relay 33 from a normal to a second operating condition. In this manner, the control device or relay 33 is effective to actuate the solenoid operated mechanism 25 and disengage the clutch 24 in the manner described hereinabove.

Figure 3:
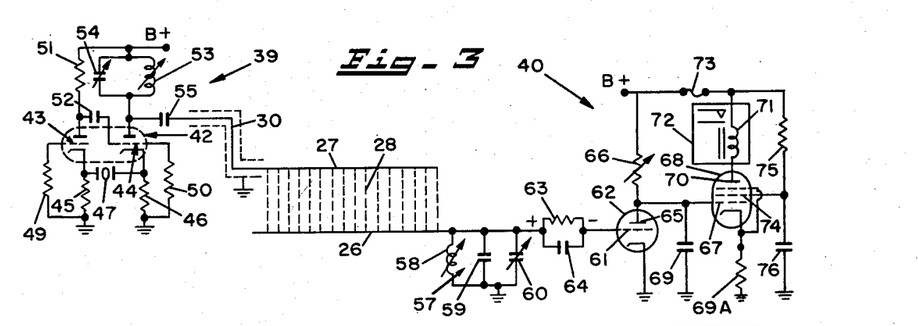
Fig. 3 is a schematic diagram of transmitter and receiver circuits which may be employed in the electronic guard device of Figs. 1 and 2.

Fig. 3 illustrates, in simplified form, typical circuits which may be utilized in conjunction with the embodiments of Figs. 1 and 2, and particularly Fig. 1. This circuit includes a transmitter portion 39 and a receiver portion 40. The signal generator or transmitter 39 includes a dual triode 42 comprising a first electrode system 43 and a second electrode system 44. The cathodes of the electrode systems 43 and 44 are grounded through a pair of biasing resistors 45 and 46, respectively, and are electrically coupled to each other through a crystal 47. The control electrodes of the systems 43 and 44 are returned to ground through suitable resistors 49 and 50 respectively. The anode of the electrode system 43 is connected to a suitable source of positive unidirectional operating potential, herein designated as B+, through a load resistor 51, and is also coupled to the control electrode of the electrode system 44 by means of a coupling capacitor 52. The anode of the second electrode system 44, on the other hand, is connected to the D.C. source B+ through a parallel-resonant circuit comprising an inductance 53 and a capacitance 54; either one or both of the impedances 53 and 54 may be made adjustable to afford a means for tuning the transmitter circuit. The anode of the electrode system 42 is coupled to the output conductor 30 by means of a coupling capacitor 55.

It will be recognized by those skilled in the art that the signal generator 39 illustrated in Fig. 3 is of conventional construction and comprises a well known type of crystal-controlled oscillator circuit. Accordingly, a detailed description of the circuit impedances and of the circuit operation is unnecessary herein. It is sufficient to note that the signal generator 39 develops an unmodulated output signal of substantially constant amplitude and frequency, the operating frequency being determined by the tuning of the resonant circuit 53, 54 and by the crystal 47. Preferably, the frequency of the transmitter 39 is established at ten megacycles or more; for example, a particular operating frequency which has been found to afford satisfactory results in operation and which is acceptable to the Federal Communications Commission is 27.55 megacycles. It should be understood, however, that the invention is not limited to this or any other given operating frequency.

The input circuit of the receiver 40 comprises a parallel resonant circuit 57 including a variable inductance 58, a fixed capacitance 59, and a variable capacitance 60 connected in parallel with each other between the receiving antenna 26 and a plane of reference potential, here taken as ground. The resonant circuit 57 is tuned to the operating frequency of the signal generator 39. The resonant input circuit 57 is connected to the control electrode 61 of an electric discharge device 62, the coupling circuit in this instance comprising a grid leak resistor 63 and a capacitor 64 connected in parallel with each other between the antenna 26 and the control electrode 61. In the illustrated circuit, the electric discharge device 62 comprises a conventional vacuum triode; the cathode of the triode is grounded and the anode 65 thereof is connected to a suitable source of unidirectional positive operating potential B+ through a load resistor 66. Preferably, an adjustable resistor is utilized as the load impedance.

The anode 65 of the amplifier tube 62 is also connected to the control electrode 67 of a second electric discharge device 68 and is by-passed to ground for radio frequencies by a capacitor 69. The discharge device 68 is preferably a sharp cut-off vacuum tube and is shown as a pentode. The suppressor grid and cathode of the pentode 68 are connected to each other and are returned to ground through a bias resistor 69A. The anode 70 of the tube is connected to the D.-C. source B+ through the operating coil 71 of a relay 72, a fuse or other protective device 73 preferably being interposed in the anode circuit. The screen electrode 74 of the pentode amplifier is returned to B+ through a resistor 75 and is by-passed to ground for radio frequencies by a capacitor 76. The voltage supply in this circuit should be a regulated voltage source in order to assure complete control of anode current by the signal voltage on the control electrode 67.

In normal operation, and assuming that the radio frequency protective field 28 is unimpeded, the signal radiated from the antenna 27 is intercepted by the receiving antenna 26 and applied to the input circuit of the amplifier tube 62 to control conduction in that tube. The grid leak bias voltage and the voltage appearing across the tuned circuit 57 determine the amplitude of the anode current drawn by the discharge device 62 and therefore determine the voltage on the anode 65. This control voltage, in turn, is applied to the control electrode 67 of the second stage amplifier tube 68 to control conduction therein. The variable load resistor 66 may also be adjusted to determine the normal conductivity level of the two amplifier tubes.

When the pentode tube 68 is conducting at its normal level, the normally open relay 72 is energized and its contacts are closed to energize the operating coil of the clutch control mechanism 25 (Figs. 1 and 2) or other device with which the electronic guard is associated. Preferably, the solenoid operated mechanism 25 is arranged so that the machine with which it is associated is conditioned for operation whenever the coil is energized. When the protective field 28 is disturbed, however, as by introduction of a conductive object into the field space, the negative bias on the discharge device 62 is reduced, increasing the total current drawn by the tube. With this increase in conductivity, the voltage drop across the resistor 66 increases, driving the control electrode 67 of the second amplifier stage 68 negative and reducing the current drawn by the tube 68 sufficiently to effectively de-energize the coil 71 of the relay 72. Consequently, the relay contacts open, de-energizing the coil of the clutch disengaging mechanism 25 and preventing the press 21 or other device from operating.

Positive "fail safe" action of the circuit or system of Fig. 3 is assured for a number of reasons. In the event that the transmitter 39 fails in operation, the negative control potential on electrode 61 is no longer present, with the result that the second stage 68 of the receiver amplifier is driven to cut off, opening the relay 72. If the power supply for the receiver circuit fails, the relay 72 also automatically opens. In the event that the triode 62 fails in a manner such that it draws excessive plate current, the amplifier tube 68 is prevented from conducting and the relay 72 opens to disable the press or other machine with which the guard is associated. Should the discharge device 62 fail to conduct, on the other hand, the control electrode 67 of the device 68 goes highly positive and excessive current flows through the tube, actuating the fuse or other protective device 73 to open the supply circuit to the relay coil 71. The relay therefore opens and disables the machine with which it is connected. In the event that the second amplifier device 68 fails in such a manner that it draws excessive current, the protective device 73 is similarly actuated. On the other hand, if the pentode 68 falls below its normal conduction level, the relay 72 receives insufficient current and therefore opens. In this connection, it should be noted that the device 72 should comprise a relatively sensitive relay capable of closing its contacts only when it receives at least its rated current.

Positive fail-safe operation of the type described hereinabove is inherent in all of the subsequently described variations of the invention and constitutes one important feature of the invention. As indicated hereinabove, fail-safe operation is vital in any device which is employed as a guard or detector for determining the presence of an operator's hand, arm, or other member in the danger area of a press or other industrial machine and for preventing operation of the machine so long as this condition remains.

Figure 4:
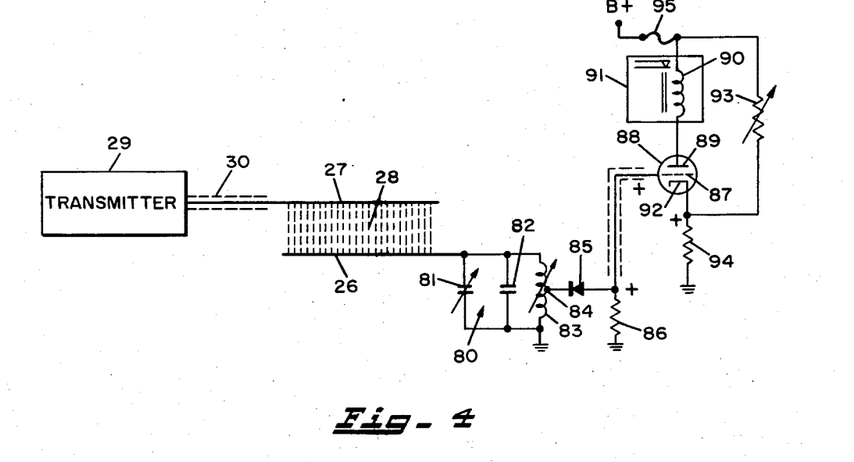
Fig. 4 is a schematic diagram of another form of receiver apparatus which may be employed in the electronic guards of Figs. 1 and 2.

In the receiver circuitry of Fig. 3, it is highly desirable that the receiver be located only a relatively short distance from the antenna 26 in order to reduce inductive losses in the connector leads, which might otherwise become excessive. Fig. 4 illustrates another and simplified receiver circuit capable of accomplishing substantially the same results as the circuit of Fig. 3 but which may be located at a substantial distance from the receiving antenna 26. In the electronic guard device shown in Fig. 4, a radio frequency signal is again generated by a transmitter 29 and applied to the transmitting antenna 27 through suitable coupling means such as the shielded cable 30. The radio frequency field 28 of the transmitting antenna 27 impinges upon the receiving antenna 26; it is thus seen that the transmitting portion of the illustrated device is substantially the same as described hereinabove in connection with Figs. 1–3.

In the embodiment of Fig. 4, a parallel-resonant circuit 80 is connected to the receiving antenna 26; this circuit comprises a variable capacitance 81, a fixed capacitance 82 and a center tapped variable inductor 83. The three impedances 81–83 are connected in parallel with each other between the receiving antenna and a plane of reference potential, here shown as ground. The center tap 84 on the inductance 83 is connected to the cathode of a diode 85. The anode of the diode 85 is returned to ground through a resistor 86 and is also connected to the control electrode 87 of an electric discharge device 88, the resistor 86 comprising the input impedance of the device 88. In the illustrated circuit, the electric discharge device 88 comprises a conventional vacuum triode. The anode 89 of the tube 88 is connected through the operating coil 90 of a relay 91 to a suitable source of positive D.C. operating potential herein designated as B+. The cathode 92 of the tube, on the other hand, is connected to a voltage divider biasing circuit comprising a variable resistor 93 and a fixed resistor 94. The resistor 93 is connected between the cathode 92 and B+, whereas the resistor 94 returns the cathode to ground. Thus, the cathode is maintained at a positive potential with respect to ground.

In operation, the wave signal received by the antenna 26 is applied to the tuned circuit 80 and to the diode 85 to develop a positive-polarity pulsating D.C. signal at the output of the diode. This pulsating D.C. control signal is applied to the control electrode 87 of the tube 88 to control conduction therein. Preferably, the circuit is adjusted, most conveniently by means of the variable resistor 93, to afford approximately zero potential difference between the control electrode 87 and the cathode 92 under normal operating conditions, that is 1, when the normal full strength signal is received by the antenna 26. Accordingly, the tube 88 normally conducts at approximately its maximum rated current, energizing the coil 90 of the relay 91 to maintain the relay in closed condition and energize the solenoid-operated control mechanism 25 (see Fig. 1).

In the event that a relatively conductive article or object is interposed in the protective RF field 28, reducing the field strength at the antenna 26, the positive control signal voltage developed across the resistor 86 is reduced in amplitude. As a consequence, the control electrode 87 of the tube 88 goes negative with respect to the cathode 92, substantially reducing the current drawn by the tube. Accordingly, the energizing current in the coil 90 is substantially reduced and the relay 91 opens to prevent operation of the press or other machine with which it is associated. As in the case of the relay 72 of Fig. 3, the relay 91 should be a relatively sensitive device which can be actuated to its closed condition only when it receives at least its rated current.

Should the anode supply voltage B+ fail, in the embodiment of Fig. 4, the discharge device 88 is rendered non-conductive and the relay 91 opens, preventing continued operation of the machine or other apparatus in which the electric guard is incorporated. In the event that the tube 88 fails to conduct or the transmitter signal is lost, the anode current of the tube 88 drops and the relay 91 is opened. A suitable fuse or other protective device 95 may be incorporated in the high voltage supply circuit to protect the device against a failure in which the tube 88 conducts an excessive current. Increased sensitivity may be obtained in the circuit of Fig. 4 by incorporating one or more additional amplifier stages, not shown, between the detector 85 and the discharge device 88, in known manner, without departing from the invention.

Figure 5:
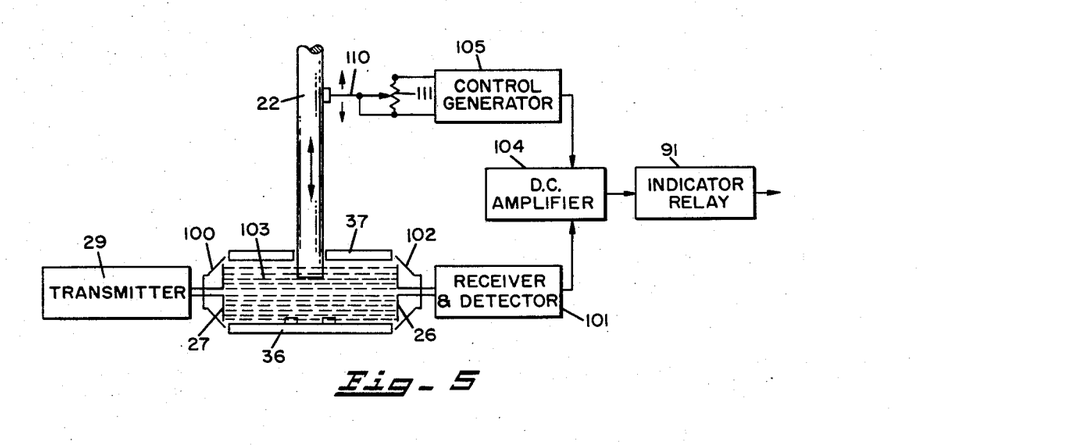
Fig. 5 is a block diagram illustrating another embodiment of the invention.
Figure 6:
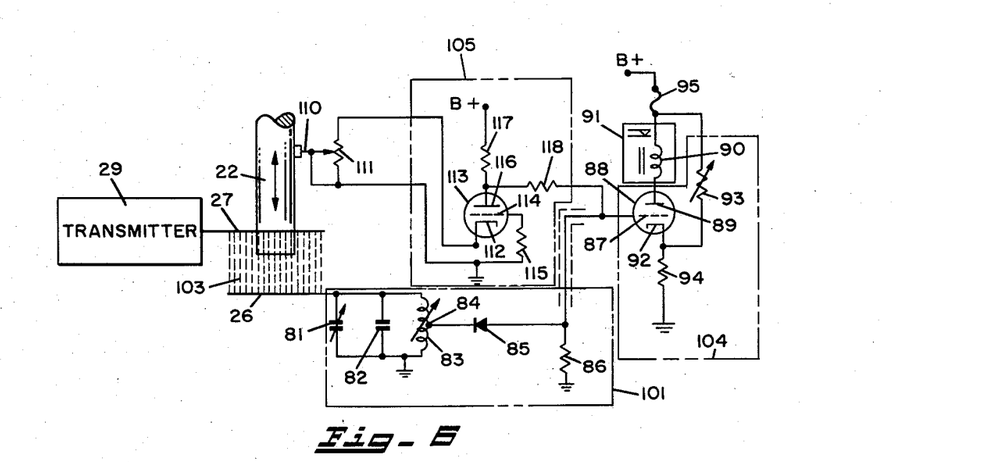
Fig. 6 is a schematic diagram of receiver circuits which may be employed in the electronic guard device of Fig. 5.

Figs. 5 and 6 illustrate, in block diagram and schematic form respectively, a modification of the embodiment of the invention shown and described hereinabove in connection with Figs. 2 and 4. As before, this embodiment of the invention includes a wave signal generator 29 which is suitably coupled to a transmitting antenna 27, the antenna 27 being located within a first wave guide box 100. This embodiment further includes a receiver and detector circuit 101, the input stage of which is coupled to the receiving antenna 26, which in this instance is located within a second wave guide box 102. In this embodiment, the wave guides 100 and 102 are constructed to afford a protective field 103 which effectively fills the entire work or danger area intermediate the platen 36 and the upper deck 37 of the press or other device with which the electronic guard is associated. The receiver circuit 101 is electrically connected to a D.C. amplifier 104 which, in turn, is connected to the indicator relay 91. In addition, a control signal generator 105 is incorporated in the electronic guard of Figs. 5 and 6 and is coupled to the D.C. amplifier 104 as described more fully hereinafter.

The receiver circuit 101, the D.C. amplifier 104, and the relay 91 are essentially similar to the corresponding portions of the circuit illustrated in Fig. 4. Thus, as indicated in Fig. 6, the receiver 101 includes a parallel resonant input circuit comprising the capacitors 81 and 82 and the center-tapped inductance 83, the tuned circuit being connected to the antenna 26. As in the previously described arrangement, the center tap 84 on the coil 83 is connected to the cathode of a detector diode 85, the anode of the diode being returned to ground through the resistor 86. The anode of the diode is also connected to the control electrode 87 of the triode electric discharge device 88, the resistor 86 comprising the input impedance of the electric discharge device.

The triode 88 is incorporated in the D.C. amplifier 104, the cathode 92 thereof being returned to ground through a resistor 94 and being connected to the B+ supply through the variable resistor 93 to afford an adjustable positive bias on the cathode. The anode 89 of the tube 88 is connected to B+ through the operating coil 90 of the relay 91. Accordingly, it is seen that the circuit of Fig. 6 as thus far described is identical with that of Fig. 4 and that the operation thereof corresponds to that described hereinabove in connection with Fig. 4.

In the electronic guard of Figs. 5 and 6, however, the ram or other operating member 22 of the industrial machine with which the guard is associated is mechanically connected to the wiper arm 110 of a potentiometer 111. One terminal of the potentiometer 111 is connected to ground and the opposite terminal is connected to the input electrode cathode 112 of an electric discharge device 113. The wiper arm 110 of the potentiometer is also grounded. The control electrode 114 of the device 113, which in this instance comprises a conventional vacuum triode, is returned to ground through a resistor 115. The anode 116 of the tube 113 is connected to a suitable D.C. source B+ through a load resistor 117. The anode 116 is also connected through a coupling resistor 118 to the control electrode 87 of the D.C. amplifier tube 88. The tube 113 and its associated circuit components comprise the control signal generator 105.

When the ram 22 is at the upper end of its operating stroke, as seen in Figs. 5 and 6, the potentiometer 111 is effectively shunted, connecting the cathode 112 directly to ground. Under these circumstances, the discharge device 113 conducts at approximately maximum rated current, maintaining the anode 116 thereof at a relatively low potential. As the ram 22 moves downwardly into the working area of the press, however, progressive increments of the resistance of the potentiometer 111 are effectively inserted in series between the cathode 112 and ground. As a consequence, the operating voltage of the anode 116 increases in a positive direction and a positive-polarity control signal is accordingly applied to the control electrode 107 of the D.C. amplifier 104. Continued movement of the ram 22 into the working area thereby progressively increases the positive-polarity control signal from the circuit 105 and tends to increase the conductivity of the D.C. amplifier tube 88.

At the same time, however, the ram 22 progressively intrudes into the sensing or protective field 103 between the anodes 26 and 27. Consequently, the ram has an effect somewhat similar to that of the operator's arm or other conductive object inserted into the RF field from outside the machine. Accordingly, downward movement of the ram progressively decreases the effective strength of the RF field as intercepted by the receiving antenna 26 with the result that the positive-polarity control signal applied to the amplifier tube 88 from the receiver and detector circuit 101 is decreased during normal operation of the press. It is thus seen that the effect of the two circuits 101 and 105 counterbalances each other and, indeed, the two circuits may be constructed to afford substantially equal and opposite control effects in normal operation. Accordingly, the control potential on the electrode 87 of the D.C. amplifier tube 88 may be maintained substantially constant during normal operation of the machine, so that movement of the ram 22 into the protective field 103 does not interrupt the machine operation. On the other hand, the introduction of any other conductive object, such as the arm or hand of the operator, into the field 103 is not compensated by the control generator 105 and effectively interrupts operation of the press or other machine as described hereinabove in connection with Figs. 2 and 4.

Figure 7:
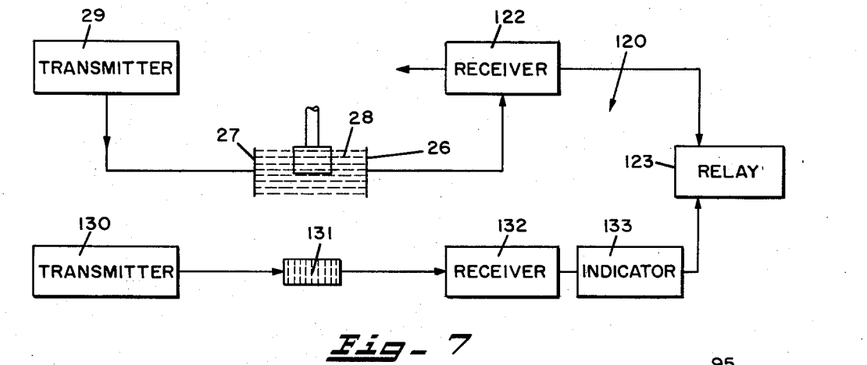
Fig. 7 is a block diagram of a further embodiment of the invention.
Figure 8:
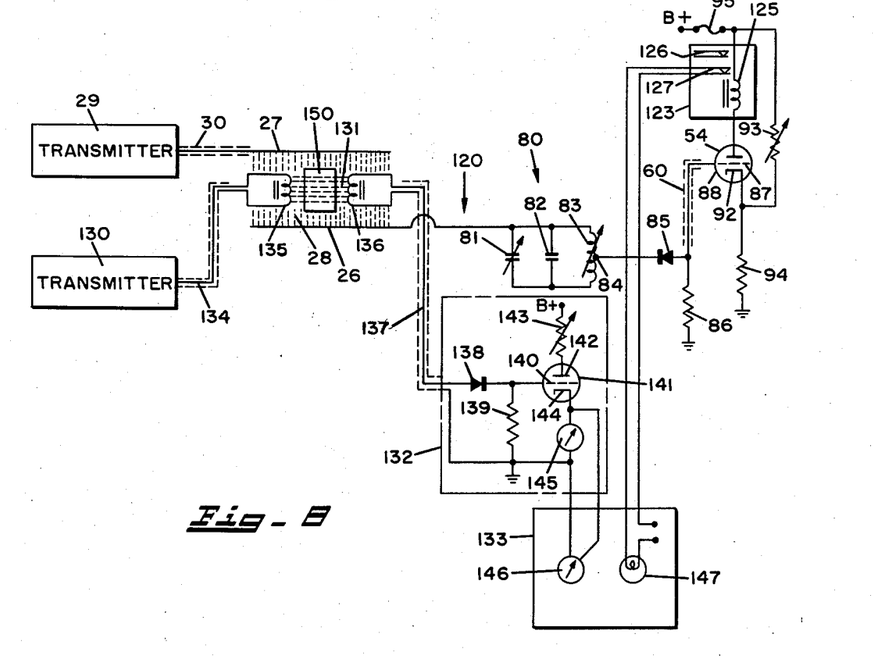
Fig. 8 is a schematic diagram of a receiver circuit which may be utilized in the electronic guard of Fig. 7.

Figs. 7 and 8 illustrate another embodiment of the invention including a means for detecting the presence and positioning of a work piece within a punch press or other industrial machine. As indicated in the block diagram of Fig. 7, a portion of the electronic guard 120 shown therein is substantially similar to the device 20 of Fig 1. Thus, the electronic guard 120 includes a wave signal generator or transmitter 29 which is electrically coupled to a transmitting antenna 27 disposed at one side of the work or danger area of the machine. The device further includes a receiving antenna 26 which is positioned to intercept a portion of the radiation field 28 from the antenna 27, the two antennas preferably defining a substantial curtain-like protection area encompassing the work area of the machine. The antenna 26 is electrically connected to a receiver 122 which may include a suitable amplifier, the receiver 122 being in turn connected to a control device herein designated as a relay 123.

As thus far described, the electronic guard 120 may utilize the circuit arrangement illustrated in Fig. 4. Accordingly, and as shown in the schematic diagram of Fig. 8, the receiver 122 may include a tuned input circuit 80 comprising the capacitances 81 and 82 and the adjustable center-tapped inductance 83. As before, the inductance tap 84 is connected to the cathode of a detector diode 85, the anode of the diode being returned to ground through the input resistor 86 connected to the control electrode 87 of a D.C. amplifier tube 88. The cathode 92 of the tube 88 is connected to a voltage divider biasing circuit including the resistors 93 and 94. The anode 89 of the tube is connected to a B+ supply through the operating coil 125 of the control relay 123. In this instance, the control relay 123 is a double pole device and includes two independent sets of contacts 126 and 127, the contacts 126 being connected to the control mechanism 25 of the press or other industrial machine (see Fig. 1).

It is thus seen that the basic protective action of the electronic guard 120 is substantially similar to that described hereinabove in connection with Figs. 1 and 4. So long as the protective field 28 remains unimpeded, the detector circuit comprising the tuned circuit 80 and the diode 85 maintains a positive control potential upon the control electrode 87 of the amplifier tube 88. Accordingly, the tube 88 conducts a substantial current which energizes the coil 125 and keeps the contacts 126 closed, thereby permitting operation of the press or other machine tool as described hereinabove. Whenever a relatively conductive object interferes with the field, however, the control signal applied to the tube 88 is reduced in amplitude, the tube current drops, and the relay 123 is actuated to a second condition in which the machine is effectively prevented from operation.

The electronic guard 120 also includes a second wave signal generator 130 which develops an additional protective field 131 within the work area of the industrial machine. This second protective field 131 effectively couples the transmitter 130 to a second receiver 132 which is utilized to afford an indication of the presence and positioning of a work piece within the press or other machine. The receiver 132 may be connected to a suitable indicator device 133 which may also be electrically connected to the relay 123.

A detailed schematic circuit for the receiver 132 and the indicator 133 is illustrated in Fig. 8. As indicated therein, the second transmitter 130 is electrically connected, as by means of a shielded cable 134, to a first inductance coil 135 which is located within the work space of the machine with which the electronic guard 120 is associated. Preferably, the inductance coil 135 is not located within the curtain-like radiation field between the antennas 26 and 27, although this is not essential in all applications. The sensing or pick-up device in this instance comprises a second inductance coil 136 which is also located within the work space or danger area of the machine and which is inductively coupled to the coil 135 by the induction field 131. In this embodiment of the invention, the secondary signal generator 130 is preferably operated at a much lower frequency than the transmitter 29, since operation of the indicator portion of the electronic guard 120 is predicated upon the use of an induction field rather than a radiation field. Thus, the operating frequency of the signal generator 130 is preferably of the order of 100 kilocycles or less in order to permit establishment of a magnetic field of reasonable strength coupling the two coils 135 and 136 as described more fully hereinafter.

The inductance coil 136, in this circuit, is electrically connected as by a shielded cable 137 to the anode of a detector diode 138. The cathode of the diode 138 is returned to ground through a resistor 139, the other terminal of the coil 136 being grounded. The cathode of the diode 138 is also connected to the control electrode 140 of an electric discharge device 141, here shown as a conventional vacuum triode, and the resistor 139 thus constitutes the input impedance of the tube 141. The anode 142 of the triode is connected to a suitable B+ source through a variable resistor 143. The cathode 144 of the tube, on the other hand, is returned to ground, a suitable ammeter 145 being connected in series in the cathode circuit. An additional meter 146 may be connected in an alternate cathode return path and this meter constitutes the principal indicating element of the indicator device 133. In addition, the device 133 may include a lamp 147 energized from a suitable source, not shown, through a series circuit including the normally open contacts 127 of the relay 123.

In operation, the auxiliary protective device comprising the transmitter 130, the receiver 132, and the indicator device 133 is utilized to detect the size and positioning of a work piece 150 within the work area of the industrial machine with which the electronic guard 120 is associated. The signal generator 130 develops a relatively low frequency signal which is supplied to the first inductance coil 135 through the connecting circuit 134. As long as no work piece is present in the machine, only a relatively weak induction field is intercepted by the output coil 136 with the result that only a negligible negative-polarity D.C. control potential is developed across the input resistor 139 of the amplifier tube 141. As a consequence, the tube 141 conducts at approximately its maximum rated current, the current being indicated on both of the meters 145 and 146. As long as the machine is in condition for operation, that is, as long as the relay 123 is energized, the contacts 127 remain closed and the lamp 147 indicates to the operator that the machine is ready for operation.

As soon as an iron, steel, or other magnetic work piece 150 is positioned in the work area of the machine, however, the circuit conditions in the receiver 132 and the indicator 133 are markedly changed. Positioning of the work piece intermediate the two coils 135 and 136 greatly increases the mutual coupling between the coils and thus, in effect, increases the strength of the induction field 131. Consequently, a pulsating D.C. control potential of negative polarity and substantial amplitude is developed across the resistor 139, effectively driving the tube 141 toward cut-off. Accordingly, the current drawn by the tube 141 is substantially reduced, the reduction in amplitude affording a measure of the size and the location of the work piece 150. This information is indicated to the operator by the meters 145 and 146; accordingly, the operator is able to determine whether or not a work piece is positioned in the machine and whether or not it is located intermediate the coils 135 and 136. In this manner, the operator is informed as to when the machine operation should be started. Moreover, as the dimensions of the work piece 150 are changed by the operation of the machine, further changes in the mutual coupling between the coils 135 and 136 take place, affording the operator an indication of the progress of the machine operation.

In all of the embodiments of the invention described hereinabove, the illustrated control circuits, where shown in detail, have utilized vacuum tubes as amplifiers, signal generators, and like apparatus. It will be obvious to those skilled in the art, however, that other electric discharge devices may be employed without departing in any sense from the invention. For example, any of the several amplifier tubes, including discharge devices 62, 68, 88, 113 and 141, may be replaced by solid-state electric discharge devices such as transistors, provided that the well known equivalent amplifier circuits are utilized instead of the vacuum tube circuits shown in the several figures. By the same token, a transistor oscillator circuit may be utilized in any of the transmitters described hereinabove without entailing any substantial change in the inventive concept.

It is to be understood that the scope of the term "tube" as employed in the claims is intended also to define any device such as set forth above having functions similar to that of the vacuum tubes herein described.

Electronic guard devices constructed in accordance with the invention are extremely rapid in action and therefore afford maximum protection to a machine operator. The operation of the guard devices is positive in nature and is not dependent in any sense upon exertion of any force by the machine operator or upon deflection or movement of any physical member. In certain of the embodiments, the guard device is adapted to distinguish between parts of the machine and foreign objects; in others the guard device detects and measures the work piece in the machine. Moreover, the guard devices of the invention are easily and conveniently made fail safe and effectively protect the operator in the event of failure of either components or of the power supply.

While preferred embodiments of the invention have been described and illustrated, it is to be understood that these are capable of variation and modification. Accordingly, the aim in the appended claims is to cover all such variations and modification as may fall within the true spirit and scope of the invention.

I claim:

1. In a machine having an operating member which moves into a predetermined work space during a machine operation, an electronic guard device comprising a transmitting antenna disposed adjacent said work space; a signal generator, coupled to said transmitting antenna, for generating and applying to said antenna a radio-frequency signal of substantially constant amplitude and given frequency to develop a radio-frequency radiation field; a receiving antenna disposed within said field adjacent said work space to define therewith a protection area including a major portion of said work space; a receiver, tuned to said given frequency and coupled to said receiving antenna, for developing a first control signal having an amplitude representative of the strength of said radio-frequency field as said field impinges upon said receiving antenna; a control device, actuatable between a normal operating condition and a second operating condition in response to an applied signal; a control signal generator, mechanically connected to said operating member of said machine, for generating a second control signal having an amplitude representative of the extent of movement of said member into said protection area; and means for applying said two control signals to said control device in aiding relationship to actuate said device from said normal operating condition to said second operating condition in response to a reduction in amplitude of said control signal caused by introduction of an electrically conductive object into said protection area without actuating said device in response to movement of said operating member into said protection area.

2. In a machine having an operating member which moves into a predetermined work space during a machine operation, an electronic guard device comprising a transmitting antenna disposed adjacent said work space; a signal generator, coupled to said transmitting antenna, for generating and applying to said antenna a radio-frequency signal of substantially constant amplitude and given frequency to develop a radio-frequency radiation field; a receiving antenna disposed within said field adjacent said work space to define therewith a protection area including a major portion of said work space; a receiver, coupled to said receiving antenna, for developing a variable D.C. control signal having an amplitude representative of the strength of said radio-frequency field as said field impinges upon said receiving antenna, said receiver comprising a detector circuit tuned to said given frequency and a D.C. amplifier coupled to and controlled by said detector circuit; a control device, actuatable between a normal operating condition and a second operating condition in response to an applied signal; a control signal generator, mechanically connected to said operating member of said machine, for generating a second control signal having an amplitude representative of the extent of movement of said member into said protection area; and means for applying said two control signals to said control device in aiding relationship to actuate said device from said normal operating condition to said second operating condition in response to a reduction in amplitude of said control signal caused by introduction of an electrically conductive object into said protection area without actuating said device in response to movement of said operating member into said protection area.

3. In a machine having an operating member which moves into a predetermined work space during a machine operation, an electronic guard device comprising a transmitting antenna disposed adjacent said work space; a signal generator, coupled to said transmitting antenna, for generating and applying to said antenna a radio-frequency signal of substantially constant amplitude and given frequency to develop a radio-frequency radiation field; a receiving antenna disposed within said field adjacent said work space to define therewith a protection area including a major portion of said work space; a receiver, tuned to said given frequency and coupled to said receiving antenna, for developing a first control signal having an amplitude representative of the strength of said radio-frequency field as said field impinges upon said receiving antenna; a control device, actuatable between a normal operating condition and a second operating condition in response to an applied signal; a control signal generator, comprising a D.C. amplifier, a variable impedance in the discharge path of said amplifier, and means mechanically connected to said operating member of said machine for adjusting said variable impedance in response to movement of said operating member, for generating a second control signal having an amplitude representative of the extent of movement of said member into said protection area; and means for applying said two control signals to said control device in aiding relationship to actuate said device from said normal operating condition to said second operating condition in response to a reduction in amplitude of said control signal caused by introduction of an electrically conductive object into said protection area without actuating said device in response to movement of said operating member into said protection area.

4. In a machine having an operating member which moves into a predetermined work space during a machine operation and a drive mechanism for said member, an electronic guard device comprising a transmitting antenna disposed adjacent said work space; a signal generator, coupled to said transmitting antenna, for generating and applying to said antenna an unmodulated radio-frequecy signal of substantially constant amplitude and given frequency to develop a radio-frequency radiation field; a receiving antenna disposed within said field adjacent said work space to define therewith a protection area of predetermined configuration; a receiver, tuned to said given frequency and coupled to said receiving antenna, for developing a first control signal having an amplitude representative of the strength of said radio-frequency field as said field impinges upon said receiving antenna; a control device, comprising a relay actuatable between an open condition and a closed condition in response to an applied signal; means for applying said control signal to said control device to maintain said device in said closed condition when said protection area is unimpeded and to actuate said device to said open condition in response to a reduction in amplitude of said control signal caused by introduction of an electrically conductive object into said protection area; and an electrically operable actuating mechanism, electrically connected to said relay and mechanically connected to said machine drive mechanism, for preventing operation of said drive mechanism whenever said relay is open.

5. A radio frequency wave operated protecting device for protecting a danger area in a machine tool while compensating for the entry of a known object into said danger area, said protecting device including a transmitter forming a source of radio frequency waves; a transmitting antenna connected to said transmitter to transmit said waves and located at one side of the area to be protected; a receiving antenna spaced from said transmitting antenna and located at another side of said area to be protected, said waves forming a field across said area between said antennas; a detector including a resonant circuit connected to said receiving antenna; means rectifying the output voltage of said resonant circuit; electrically operated indicator means connected to be operated by the rectified output voltage of said resonant circuit; potentiometer means operated by the movement of said known object into said field, and means having a D.C. output voltage controlled by said potentiometer, said D.C. output voltage increasing as said rectified voltage decreases and said voltages adding together to produce a substantially constant voltage for controlling said indicator means except when another object reduces the strength of the signal being received by said receiving antenna.

6. A radio frequency wave operated protecting device for protecting a danger area in a machine tool while compensating for the entry of a known object into said danger area, said protecting device including a transmitter forming a source of radio frequency waves; a transmitting antenna connected to said transmitter to transmit said waves and located at one side of the area to be protected; a receiving antenna spaced from said transmitting antenna and located at another side of said area to be protected, said waves forming a field across said area between said antennas; a detector including a resonant circuit connected to said receiving antenna; a diode rectifying the output voltage of said resonant circuit; an indicator control tube having a cathode, grid and plate, said rectified output voltage being applied to said grid for controlling the flow of current from said cathode to said plate; electrically operated indicator means connected to be operated by said plate voltage; potentiometer means operated by the movement of said known object into said field; means having a D.C. output voltage controlled by said potentiometer, said means including a second tube having a cathode, grid and plate, said potentiometer controlling the negative bias on said grid to control the current flow from said cathode to said plate; means connecting said plate to the grid of said indicator control tube; said D.C. output voltage of said second tube increasing as said rectified voltage decreases and said voltages adding together to produce a substantially constant bias on the grid of said first tube except when another object reduces the strength of the signal being received by said receiving antenna.

References Cited in the file of this patent

UNITED STATES PATENTS

| | | |
|---|---|---|
| 2,247,246 | Lindsay et al. | June 24, 1941 |
| 2,490,679 | Davidson | Dec. 6, 1949 |
| 2,513,745 | Reynolds | July 4, 1950 |
| 2,601,472 | Van Weel | June 24, 1952 |
| 2,649,538 | Marlowe et al. | Aug. 18, 1953 |
| 2,656,527 | Tillman et al. | Oct. 23, 1953 |